US006885008B1

(12) United States Patent
Douglas et al.

(10) Patent No.: US 6,885,008 B1
(45) Date of Patent: Apr. 26, 2005

(54) ACHROMATIC RECIRCULATED CHICANE WITH FIXED GEOMETRY AND INDEPENDENTLY VARIABLE PATH LENGTH AND MOMENTUM COMPACTION

(75) Inventors: David R. Douglas, Newport News, VA (US); George R. Neil, Williamsburg, VA (US)

(73) Assignee: Southeastern Univ. Research Assn., Newport News, VA (US)

( * ) Notice: Subject to any disclaimer, the term of this patent is extended or adjusted under 35 U.S.C. 154(b) by 0 days.

(21) Appl. No.: 10/383,823

(22) Filed: Mar. 7, 2003

(51) Int. Cl.[7] .................... H01S 3/02
(52) U.S. Cl. .................... 250/396 ML; 372/2
(58) Field of Search .................... 250/396 ML; 372/2, 372/18, 25, 108

(56) References Cited

U.S. PATENT DOCUMENTS

| | | | | | |
|---|---|---|---|---|---|
| 4,389,572 | A | | 6/1983 | Hutcheon | |
| 4,491,948 | A | | 1/1985 | Deacon et al. | |
| 4,795,912 | A | | 1/1989 | Maschke | |
| 5,130,994 | A | * | 7/1992 | Madey et al. | 372/2 |
| 5,956,353 | A | * | 9/1999 | Nguyen et al. | 372/2 |

* cited by examiner

*Primary Examiner*—Kiet T. Nguyen

(57) ABSTRACT

A particle beam recirculated chicane geometry that, through the inducement of a pair of 180 degree bends directed by the poles of a pair of controllable magnetic fields allows for variation of dipole position, return loop radii and steering/focussing, thereby allowing the implementation of independent variation of path length and momentum compaction.

7 Claims, 2 Drawing Sheets

ACHROMATIC RECIRCULATED CHICANE WITH FIXED GEOMETRY AND INDEPENDENTLY VARIABLE PATH LENGTH AND MOMENTUM COMPACTION

The United States of America may have certain rights to this invention under Management and Operating contract No. DE-AC05-84ER 40150 from the Department of Energy.

FIELD OF THE INVENTION

The present invention relates to an achromatic recirculated chicane having a fixed geometry while providing independently variable path length and momentum compaction. Such a device provides a means of improving and simplifying the control of beam dynamics in charged particle beam transport systems.

BACKGROUND OF THE INVENTION

Achromatic chicanes are frequently used in accelerators and beam lines to avoid mechanical interferences amongst components, provide adjustment of beam path length and time of flight, and to introduce momentum compaction for management of the beam longitudinal phase space. The geometry of a conventional chicane (see FIG. 1 described more fully below) illustrates that all of these functions are linked. The geometry is set by the chicane excitation, as is the path length and the momentum compaction. It is not possible to change one property without altering the other two. Moreover, the accessible range of path length variation and momentum compaction is limited by the available bend fields and/or bend aperture and/or range of motion of the central bend. Finally, it is not possible to make such a chicane linearly isochronous without the introduction of external focussing elements between the dipoles/magnets so as to provide a modulation of off-momentum orbits to make their path length or time of flight identical to that of the on-momentum orbit. Management of higher order momentum compactions is even more difficult; the introduction of external focussing elements imposes asymmetries on the system that render it generally unobvious as to where to appropriately locate the required nonlinear correction elements.

It would therefore be highly useful to have an achromatic recirculated chicane of a fixed geometry that provides independently variable path length and independently controllable momentum compaction.

OBJECT OF THE INVENTION

It is therefore an object of the present invention to provide an achromatic recirculated chicane of a fixed geometry that provides an independently variable path length and independently controllable momentum compaction.

SUMMARY OF THE INVENTION

According to the present invention, there is provided a particle beam recirculated chicane geometry that, through the inducement of a pair of 180 degree bends directed by the poles of a pair of controllable magnetic fields allows for variation of dipole position, return loop radii and steering/focussing, thereby allowing the implementation of independent variation of path length and momentum compaction.

DETAILED DESCRIPTION

Figure 1:
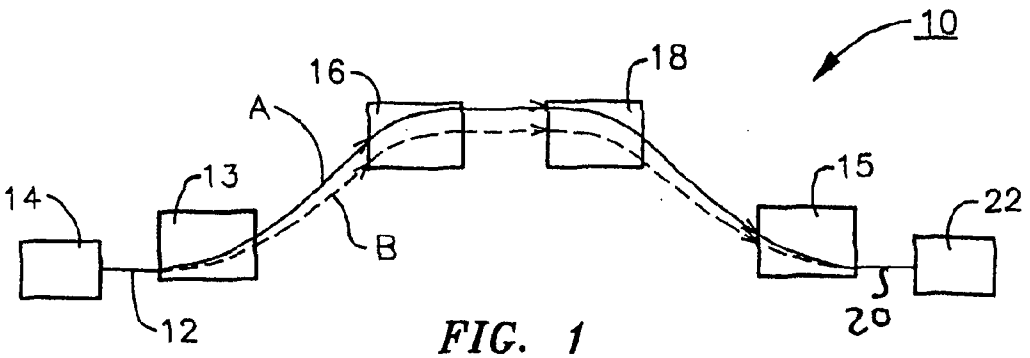
FIG. 1 (PRIOR ART)
FIG. 1 is a schematic depiction of a conventional chicane geometry.

Referring now to FIG. 1, in a conventional chicane 10, a particle beam 12 generated by a particle beam source 14 and directed into the conventional chicane through the action of magnetic field 13 comprises a plurality of particles having varying trajectories or orbits such as A and B. Each of orbits A and B have different path lengths are geometrically different and have different linear compactions. The various features of such a particle beam are adjusted, interrelationally, through the application of magnetic fields 16 and 18 produced by magnets or dipoles such that an adjusted beam 20 is reintroduced into beam transport system 22. The paths of particle beams 12 and 20 are introduced and extracted from the conventional chicane through the action of magnetic fields 13 and 15 produced by suitable magnets or dipoles. In such a chicane configuration, adjustment of beam path length, time of flight and momentum compaction is difficult since all of these variables or functions are related and alteration of one of these properties of the beam results in alteration of the other two.

It has now been discovered that the constraints of traditional chicane geometry can be removed by the addition of a return loop through the offset bend of the primary chicane (see FIG. 2 and the detailed description below). The use of parallel-faced 180 degree bends ensures that all dispersed, off-momentum backleg trajectories are parallel to the on-momentum orbit, so the system is dispersion suppressed to all orders. Arbitrarily large path length variation can be achieved by changing the separation of the 180 degree bends. Momentum compaction and path length can be changed by changing the orbit radius in the return loop dipoles (e.g. orbits A and B in FIG. 2). Momentum compaction alone can be changed independently of path length by altering the orbit radius and bend separation in a compensatory manner (see orbits between points C and D in FIG. 2). By the specific choice of 180 degree bend radius ($\rho_{180}$~$(\theta/\pi)\times d$) where d is the orbit offset of the primary chicane and θ is the bend angle in the primary chicane (see FIG. 2) the entire recirculated chicane becomes isochronous despite the absence of any external focussing.

Figure 2:
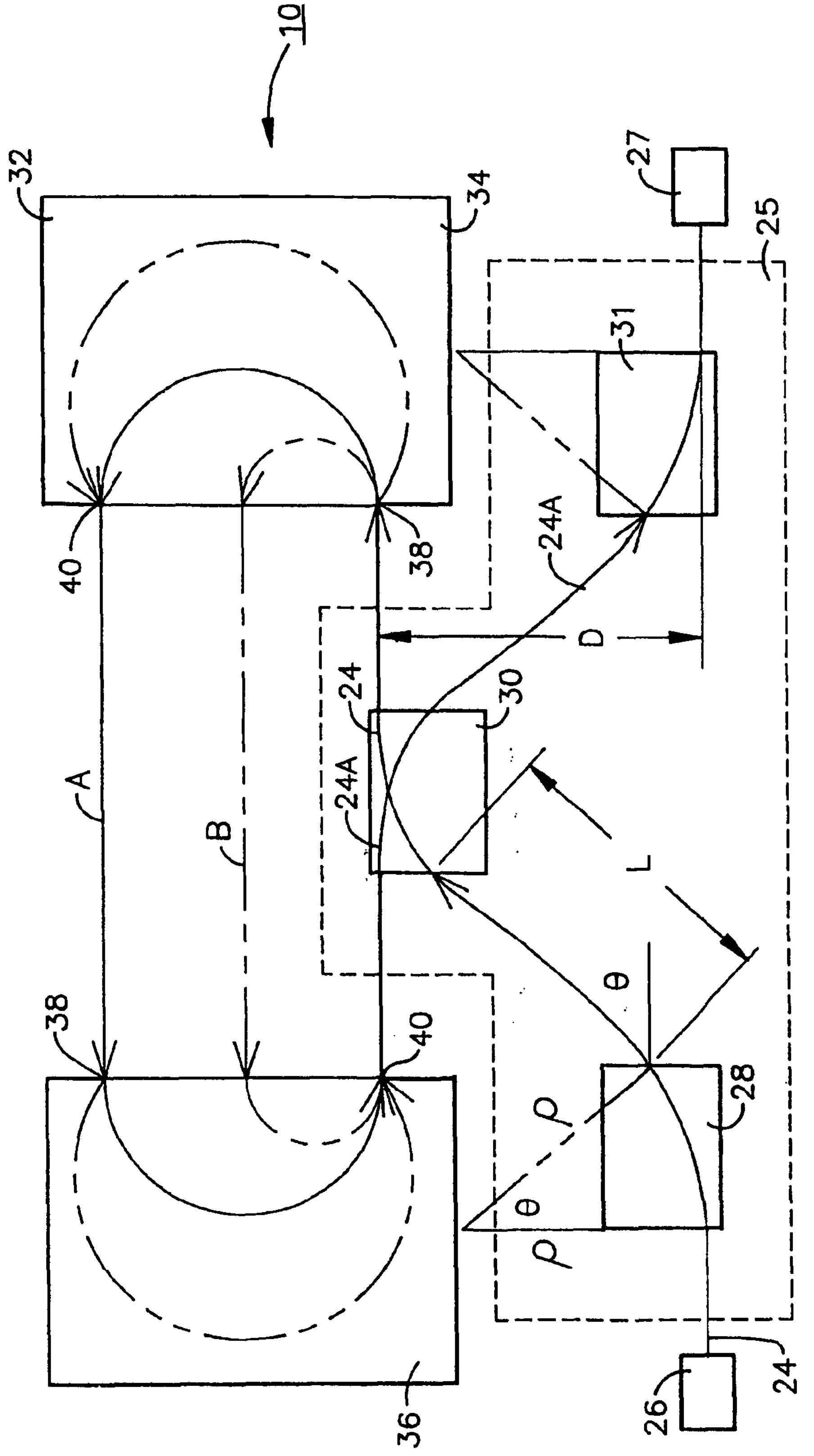
FIG. 2 is a schematic depiction of one embodiment of the recirculated chicane geometry of the present invention.

Referring now to FIG. 2, in the chicane configuration of the present invention, a particle beam 24 from a beam source 26 is directed by means of primary chicane 25 magnet or dipole generated magnetic fields 28 and 30 into the return loop chicane 32 of the present invention. In return loop chicane 32 beam 24 again comprising a plurality of particles having varying trajectories or orbits such as A and B is steered by controllable magnet or dipole induced magnetic fields 34 and 36. Modified particle beam 24A is then returned to beam transport device 27 through the action of magnetic fields 30 and 31 of primary chicane 25.

Steering at the pole faces of the 180 degree bends (e.g. orbits from points 38 to 40 in FIG. 2) allows an alternative mechanism for variation of the path length without motion or variation of dipole fields 36 and 36. Implementation of mulitpole (quadrupole, sextupole, octupole, . . . ) correction at the pole faces of the 180 degree dipoles (i.e. at points 38 and 40) allows independent, order-by-order variation of the momentum compaction ($M_{56}$, $T_{566}$, $W_{5666}$, . . . ) to any arbitrary order without affecting suppression of transverse dispersion to all orders. Such implementation does, however, preclude the use of the orbit-radius-based path length and compaction management described in connection with FIG. 1 above.

All of the above manipulations are accomplished in the recirculation path and therefore occur independently of the geometry of the primary chicane itself. Thus, mechanical interferences and constraints present in traditional chicane geometries are alleviated.

The transverse focussing properties of the system described herein can be quite good. The system linear behavior is that of a drift in the bending plane. The linear behavior can be rendered focusing or nonfocusing in the non-bending plane as needed. If the bend angle θ and orbit radius ρ of the primary chicane are chosen to match the length L of the offset drift according to $L=2\rho\tan\theta$, the nonbend plane linear behavior also becomes driftlike, albeit at a different length than that of the bend plane transport (for which the drift length is the trajectory length). Proper choice of primary chicane and return loop geometry can in fact force the effective drift length in the non-bending-plane drift to appear negative. Such determinations are well within the capabilities of the artisan skilled in the manipulation of particle beams and accordingly are not elaborated upon further herein.

The return loop, based as it is on 180 degree bends and drifts, need not bend in the plane of the primary chicane. That portion of the transport appears driftlike regardless of orientation.

This system thus addresses and alleviates a number of deficiencies of traditional chicane geometries:

It decouples the chicane geometry from path length and momentum compaction.

It allows variation of path length and momentum compaction without changes in primary chicane geometry.

It can be made linearly isochronous without the introduction of external focussing.

It admits an operational scenario which, through the use of external focussing, will allow management of momentum compaction to arbitrarily high order in a system that is achromatic to all orders.

Figure 3:
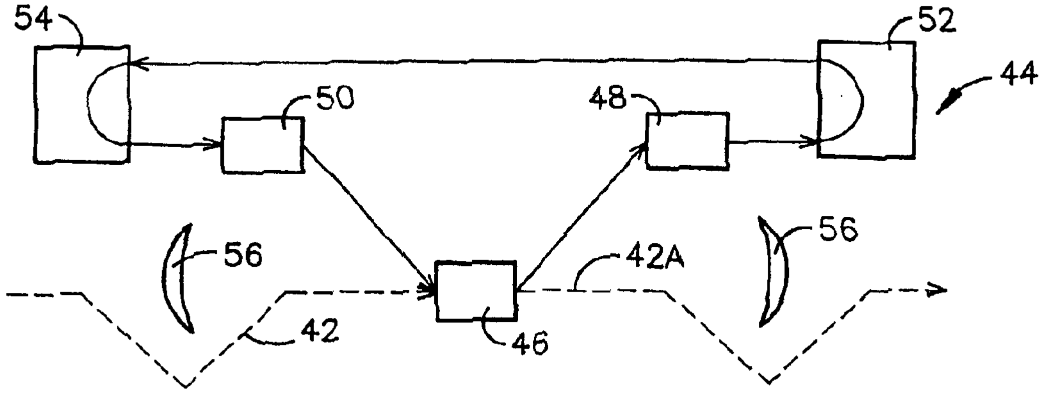
FIG. 3 is a schematic depiction of an alternative preferred embodiment of the recirculated chicane geometry of the present invention.
Figure 4:
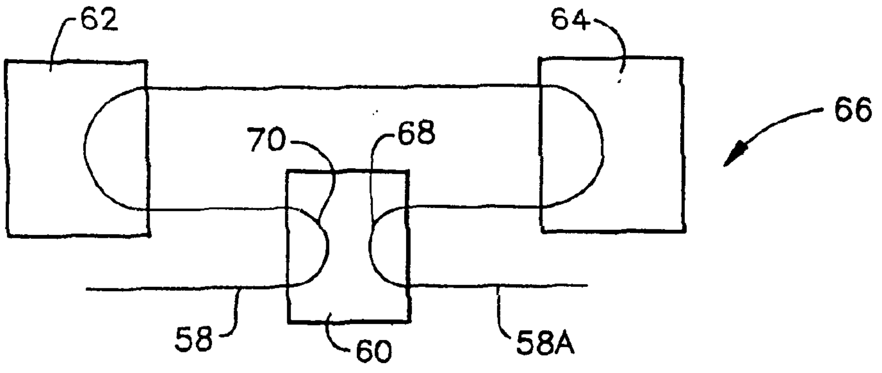
FIG. 4 is yet another schematic depiction of an alternative preferred embodiment of the recirculated chicane geometry of the present invention.

Referring now to FIGS. 3 and 4 that each depict alternative configurations/applications of the novel return loop chicane geometry described herein, in the embodiment depicted in FIG. 3, particle beam 42 is directed into return loop 44 and extracted therefrom by the action of magnetic fields 46, 48 and 50 as described in connection with FIG. 1. Loop bending of beam 42 is obtained through the action of dipole induced magnetic fields 52 and 54. Such a geometry has potential application as a storage ring or linac transport channel insertion for the adjustment of momentum compaction independently of path length and dispersion. It could as well be used to allow for interaction of photon and electron beams or for the amplification of light or X-ray beams with the introduction of moveable optical mirrors 56, as show in FIG. 2. In such an embodiment, placement of optical mirrors 56 into the path of outcoming beam 42A would provide such an amplification system.

Referring now to FIG. 4, incoming particle beam 58 is subjected to a pair of 180 degree bends through the action of magnetic fields 60, 62 and 64 to emerge from return loop chicane 66 as modified particle beam 58A. This embodiment, could have application in longitudinally space-constrained systems to allow compaction/path length management within a smaller longitudinal footprint. The recirculated beam could also be brought into collision in the common region within bends 68 and 70, or an optical cavity (not shown) placed in this location to collect and amplify synchrotron radiation. Because the chicane reverse bending has been suppressed, the compaction is nominally positive, unless external focussing is supplied adjacent the recirculation dipoles 62 and 64. Such a system is thus not nominally isochronous, though independent path length and compaction adjustment are available in the other geometries.

As the invention has been described, it will be apparent to those skilled in the art that the same may be varied in many ways without departing from the spirit and scope of the invention. Any and all such modifications are intended to be included within the scope of the appended claims.

What is claimed is:

1. An achromatic recirculating chicane comprising:

A) a primary chicane; and

B) a return loop defined by at least one pair of controllable magnets or dipoles that generate parallel faced magnetic fields that induce a pair of 180 degree bends in a particle beam introduced thereto from said primary chicane.

2. The achromatic recirculating chicane of claim 1 wherein said pair of controllable magnetic fields can be altered as to position or strength.

3. A method for obtaining independently variable path length and momentum compaction in a particle beam comprising introducing the particle beam into an achromatic recirculating chicane comprising:

A) a primary chicane; and

B) a return loop defined by at least one pair of controllable magnets or dipoles that generate parallel faced magnetic fields that induce a pair of 180 degree bends in a particle beam introduced thereto from said primary chicane.

4. The method of claim 3 wherein momentum compaction alone is changed by altering the strength or position of said pair of controllable magnetic fields to thereby alter the orbit bend radius and bend separation of said recirculating chicane.

5. The method of claim 3 wherein the recirculated chicane becomes isochronous by the specific choice of 180 degree bend radius defined by the formula $\rho_{180}$~$(\theta/\pi\times d)$ where d is the orbit offset of the primary chicane and θ is the bend angle in the primary chicane.

6. An achromatic recirculating chicane comprising a return loop defined by at least one pair of controllable magnets or dipoles that generate parallel faced magnetic fields that induce a pair of 180 degree bends in a particle beam introduced thereto.

7. The achromatic recirculating chicane of claim 6 wherein said pair of controllable magnetic fields can be altered as to position or strength.

* * * * *